US012555151B2

(12) United States Patent
Wang et al.

(10) Patent No.: US 12,555,151 B2
(45) Date of Patent: Feb. 17, 2026

(54) SHELF-SPECIFIC FACET EXTRACTION

(71) Applicant: Walmart Apollo, LLC, Bentonville, AR (US)

(72) Inventors: Zigeng Wang, Cupertino, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 169 days.

(21) Appl. No.: 17/588,248

(22) Filed: Jan. 29, 2022

(65) Prior Publication Data

US 2023/0245193 A1 Aug. 3, 2023

(51) Int. Cl.
*G06Q 30/00* (2023.01)
*G06Q 30/0601* (2023.01)

(52) U.S. Cl.
CPC ... *G06Q 30/06291* (2025.08); *G06Q 30/0623* (2013.01); *G06Q 30/0624* (2025.08); *G06Q 30/0625* (2013.01); *G06Q 30/0629* (2013.01)

(58) Field of Classification Search
CPC ......... G06Q 30/06291; G06Q 30/0629; G06Q 30/0623; G06Q 30/0624; G06Q 30/0625
See application file for complete search history.

(56) References Cited

U.S. PATENT DOCUMENTS

| | | | |
|---|---|---|---|
| 9,594,540 B1 | 3/2017 | Stasior et al. | |
| 10,410,224 B1* | 9/2019 | Levanon | G06Q 30/02 |
| 10,474,670 B1* | 11/2019 | Hoover | G06N 7/01 |
| 10,635,711 B2* | 4/2020 | Achuthan | G06Q 30/0625 |
| 10,860,652 B2* | 12/2020 | Hopkins | G06F 16/9535 |
| 10,878,473 B1* | 12/2020 | Thekkanal | G06Q 30/0641 |
| 2003/0004923 A1* | 1/2003 | Real | G06F 9/453 |
| 2013/0226916 A1 | 8/2013 | Dredze et al. | |
| 2013/0290138 A1* | 10/2013 | Pan | G06Q 30/0623 |
| | | | 705/26.61 |

(Continued)

OTHER PUBLICATIONS

"Browsing Databases with Constraint Hierarchies," by Levent Orman, Electronic Commerce Research, 8, 29-56, 2008 (Year: 2008).*

(Continued)

*Primary Examiner* — Anne M Georgalas
(74) *Attorney, Agent, or Firm* — FOLEY & LARDNER LLP

(57) ABSTRACT

A method including obtaining one or more predicted shelves corresponding to the keyword query. The method additionally can include generating linked categorical facets corresponding to the one or more predicted shelves based on shelf-categorical facet linkages. The method further can include generating, using fuzzy matching, candidate shelf-specific facets based on shelf-specific facet representation mappings and the linked categorical facets. The method additionally can include determining one or more shelf-specific facets from the candidate shelf-specific facets based on facet information in the candidate shelf-specific facets. The one or more shelf-specific facets can correspond to one or more shelves of the one or more predicted shelves. The method further can include outputting the one or more shelves and one or more respective shelf-specific facets of the one or more shelf-specific facets that correspond to each of the one or more shelves. Other embodiments are described.

20 Claims, 7 Drawing Sheets

(56) References Cited

U.S. PATENT DOCUMENTS

| | | | |
|---|---|---|---|
| 2014/0143254 A1* | 5/2014 | Datta | G06F 16/9535 |
| | | | 707/E17.089 |
| 2015/0154264 A1 | 6/2015 | Lightner et al. | |
| 2017/0109804 A1* | 4/2017 | Zabian | G06F 16/22 |
| 2017/0221120 A1 | 8/2017 | Pathak et al. | |
| 2017/0287041 A1* | 10/2017 | Kim | G06F 16/9535 |
| 2017/0344622 A1* | 11/2017 | Islam | G06Q 30/0625 |
| 2018/0293636 A1* | 10/2018 | Pollak | G06Q 30/0625 |
| 2021/0240742 A1 | 8/2021 | Wang et al. | |

OTHER PUBLICATIONS

"Recommendation Framework Combining User Interests with Fashion Trends in Apparel Online Shopping," by Minjae Ok, Jong-Seok Lee, and Yun Bae Kim, Applied Sciences, 2019, 9, 2634 (Year: 2019).*

"Product Recommendation Based on Search Keywords," by Jiawei Yao, Jiajun Yao, Rui Yang, Zhenyu Chen, 2012 Ninth Web Information Systems and Applications Conference, 978-0-7695-4819-7/12, 2012 IEEE (Year: 2012).*

Recommending Similar Items in Large-scale Online Marketplaces, by Jayasimha Katukuri, Tolga Könik, Rajyashree Mukherjee and Santanu Kolay, 2014 IEEE Conference on Big Data, 978-1-4799-5666-1/14/, 2014 IEEE (Year: 2014).*

* cited by examiner

FIG. 4

SHELF-SPECIFIC FACET EXTRACTION

TECHNICAL FIELD

This disclosure relates generally to shelf-specific facet extraction.

BACKGROUND

Websites that offer items online often classify those items into various different browse pages, such as browse pages that represent categories in a taxonomy of the items. Facet information about items is often stored and displayed for items, and these facets can be used on browse pages to filter items based on facet values. Users often search for items through search queries. These search queries do not directly correspond to browse pages, so conventional techniques do not determine which facets are related and/or relevant to a search query.

BRIEF DESCRIPTION OF THE DRAWINGS

To facilitate further description of the embodiments, the following drawings are provided in which:

FIG. 4 illustrates exemplary webpage displays, showing a browse page and a filtering menu for filtering the browse page by facets;

Figure 1:
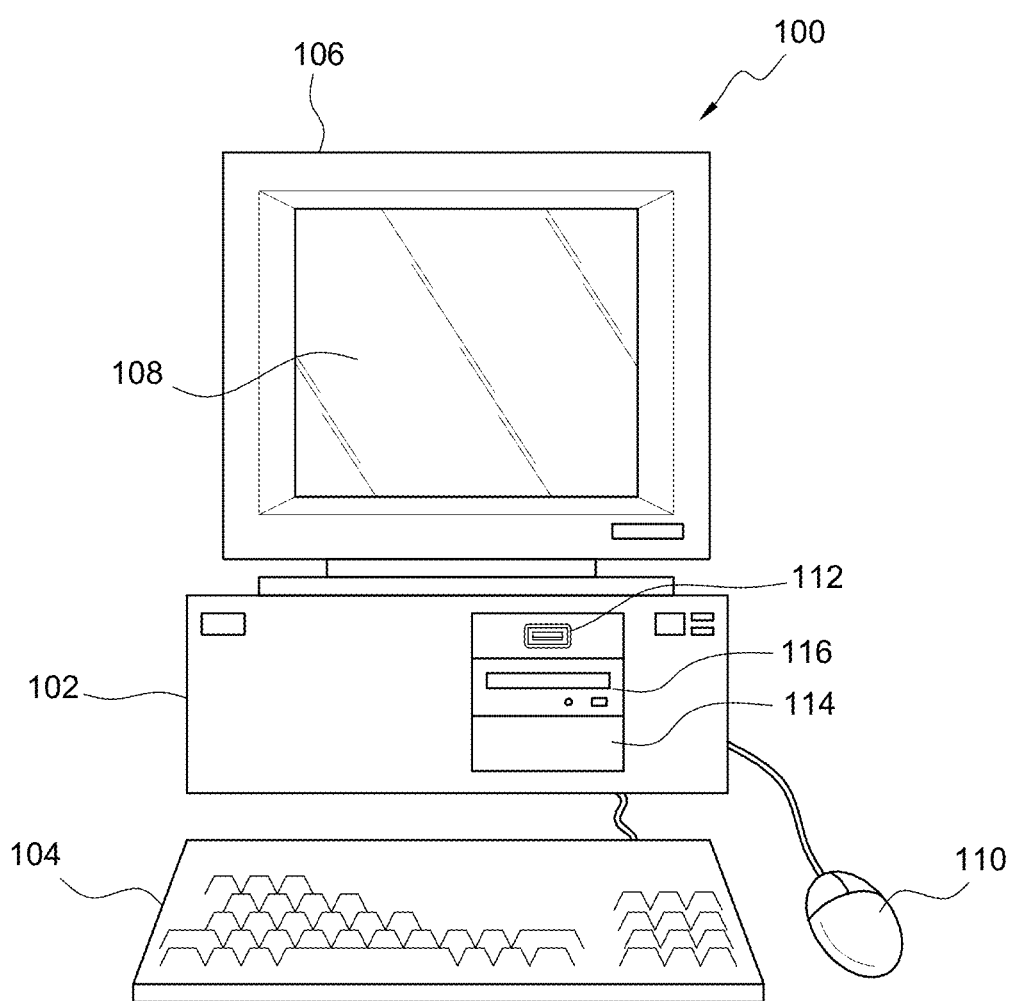
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 2:
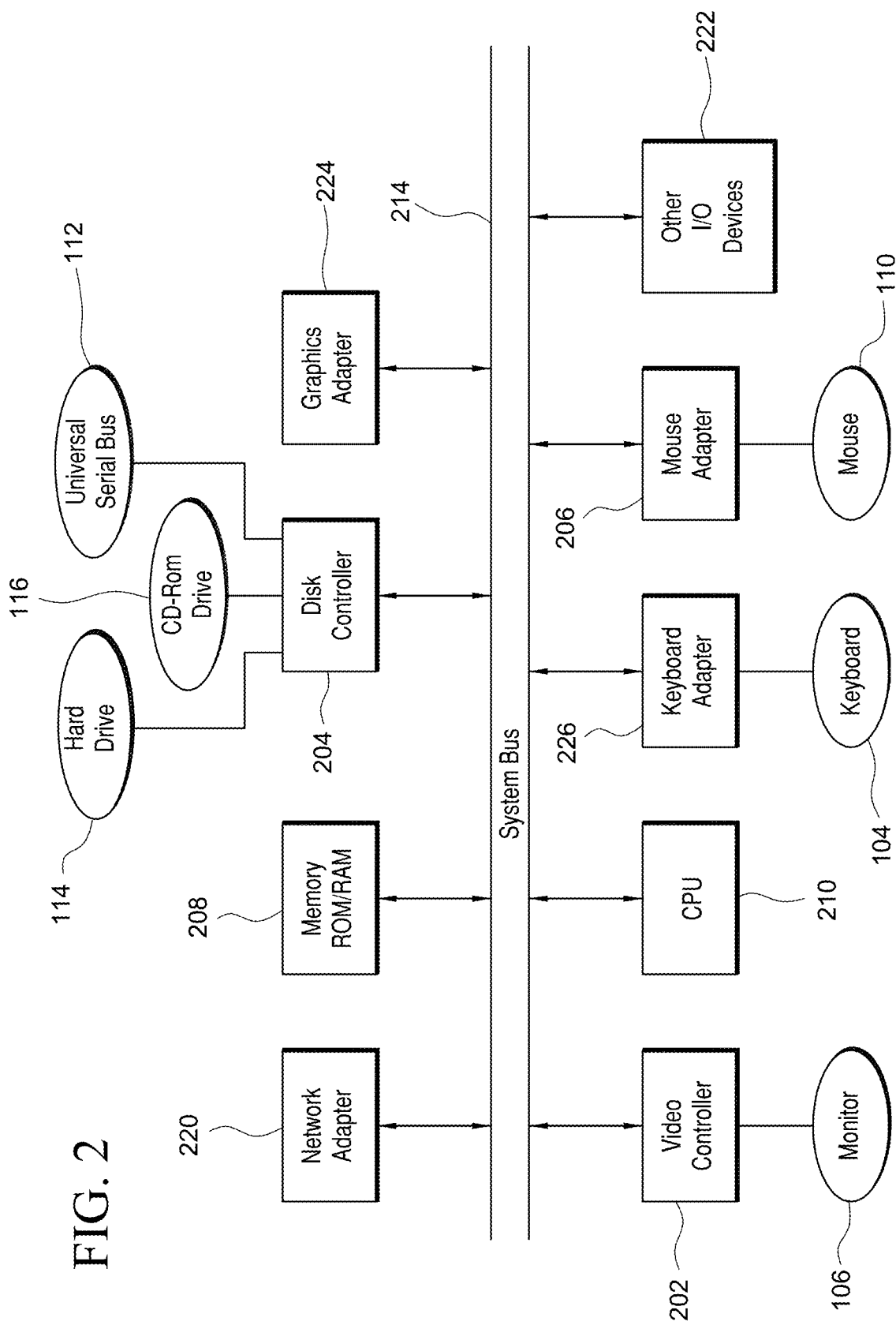
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
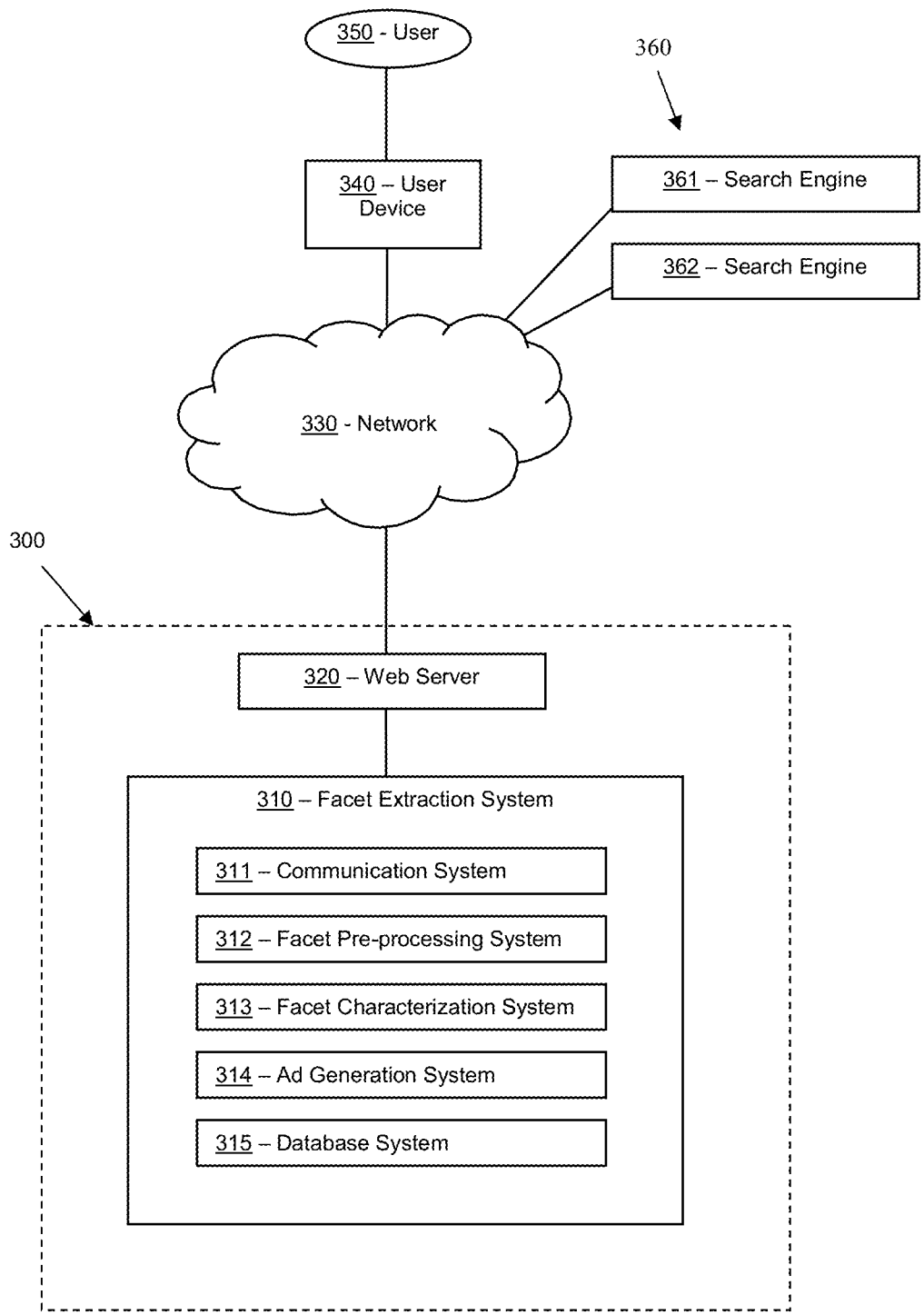
FIG. 3 illustrates a block diagram of a system that can be employed for shelf-specific facet extraction, according to an embodiment.

Turning ahead in the drawings, FIG. 3 illustrates a block diagram of a system 300 that can be employed for shelf-specific facet extraction, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a facet extraction system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Facet extraction system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host facet extraction system 310 and/or web server 320. Additional details regarding facet extraction system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to browse and/or search for items (e.g., products, grocery items), to add items to an electronic cart, and/or to purchase items, in addition to other suitable activities, or to interface with and/or configure facet extraction system 310.

In some embodiments, an internal network that is not open to the public can be used for communications between facet extraction system 310 and web server 320 within system 300. Accordingly, in some embodiments, facet extraction system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, facet extraction system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to facet extraction system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of facet extraction system 310 and/or web server 320. In a similar manner, the processors and/or the non-transitory computer-readable media can be local and/or remote to each other.

Meanwhile, in many embodiments, facet extraction system 310 and/or web server 320 also can be configured to communicate with one or more databases, such as a database system 315. The one or more databases can include a product database that contains information about products, items, or SKUs (stock keeping units), for example, among other information, such as browse shelves, shelf-specific facet representation tables, shelf-categorical facet linkage tables, and/or other suitable information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, facet extraction system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, facet extraction system 310 can include a communication system 311, a facet pre-processing system 312, a facet characterization system 313, an ad generation system 314, and/or database system 315. In many embodiments, the systems of facet extraction system 310 can be modules of computing instructions (e.g., software modules) stored at non-transitory computer readable media that operate on one or more processors. In other embodiments, the systems of facet extraction system 310 can be implemented in hardware. Facet extraction system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host facet extraction system 310 and/or web server 320. Additional details regarding facet extraction system 310 and the components thereof are described herein.

In several embodiments, facet extraction system 310 can be in data communication through network 330 with search engines 360, which can include search engine 361-362, for example. For example, search engine 361 can be the Google search engine, and search engine 362 can be the Bing search engine or the Yahoo search engine. In many embodiments, search engines 360 each can provide search engine marketing (SEM) services, such as product listing advertisements and/or keyword (e.g., textual) advertisements. These advertisements can be displayed along with or as part of search engine results pages provided by search engines 360 to users of search engines 360. In many embodiments, these advertisements can be used to drive web traffic to a website, such as an e-commerce website.

In many embodiments, system 300 can provide shelf-specific facet extraction for a query, such as extracting, from a keyword query, facets that are specific to browse shelves. In many embodiments, system 300 can characterize and/or extract shelf-specific facet information from queries. In this application, query, keyword(s), and keyword query are used interchangeably to refer to the type of queries that users can input in search engines and that can be used for SEM ads, such as keyword-based text ads and responsive search ads.

A website for an e-commerce retailer often includes browse pages. These browse pages can be pages that list items according to the categorical taxonomy of the products. For example, a browse shelf of "Outdoor Griddle Tools & Accessories," which can have a primary category path within the product taxonomy of "Patio & Garden/Grills & Outdoor Cooking/Outdoor Cooking Tools & Accessories/ Outdoor Griddle Tools & Accessories." The browse page for the browse shelf "Outdoor Griddle Tools & Accessories" can list items that are categorized into that particular category of the product taxonomy. Many browse pages for browse shelves can exist. For example, in some examples, there can be 40,000 different browse shelf pages on the website.

Figure 4:
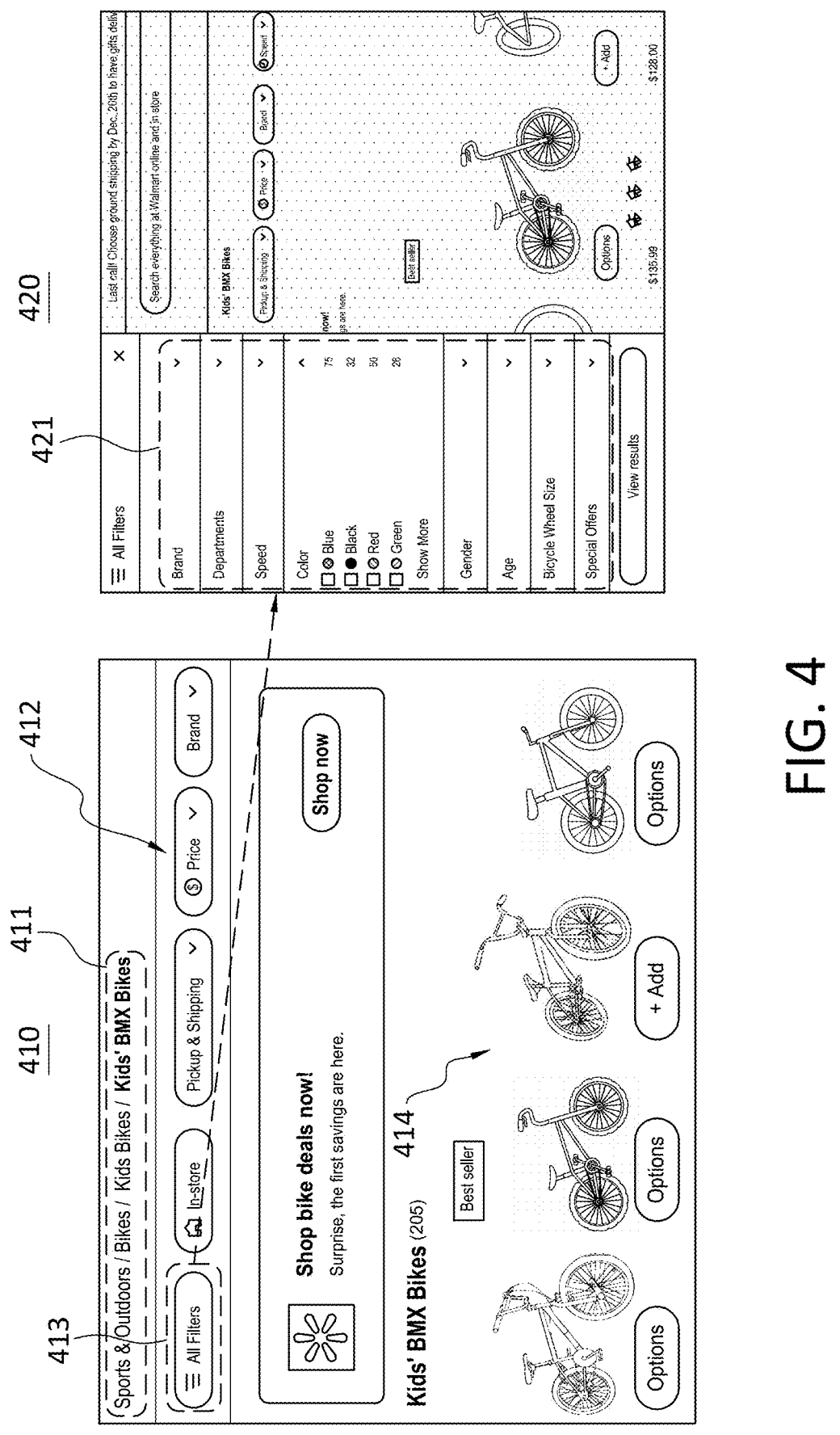

Turning ahead in the drawings, FIG. 4 illustrates exemplary webpage displays 410 and 420, showing a browse page and a filtering menu for filtering the browse page by facets. Webpage displays 410 and 420 are merely exemplary and are not limited to the examples shown and described. The webpage displays can be implemented in many different examples not specifically depicted or described herein. As shown in FIG. 4, webpage display 410 can include a browse page, which can be for a browse shelf named "Kids' BMX Bikes." Webpage display 410 can include an item listing 414. The items included in item listing 414 on the browse page can be the items that are categorized into the browse shelf category, here "Kids' BMX Bikes." Webpage display 410 can include a path indicator 411, which can display the primary category path of the taxonomy for the browse shelf In this example, the path can be "Sports & Outdoors/Bikes/Kids Bikes/Kids' BMX Bikes." Webpage display 410 can include a filter bar 412, which can include a filter menu button 413 and/or on or more filters, such as buttons or menus to filter by in-store items, pickup and/or shipping options, price, brand, and/or other suitable filter options. In many embodiments, selecting filter menu button 413 can open a filtering menu 421 to update webpage display 410 to show webpage display 420. Filtering menu 421 can allow the user (e.g., 350 (FIG. 3)) to select filters to limit the items displayed in item listing 414 according to those filters.

A number of the filtering options can be based on facets that are specific to the browse shelf. For example, for the "Kids' BMX Bikes" shelf, shelf-specific facets can include speed, color, gender, bicycle wheel size, and/or other facets types that are specific to Kids' BMX Bikes. Other browse shelves would have different shelf-specific facets. Within the browse shelf for Kids' BMX Bikes, the facet type of "color" can include facet values of various colors, such as blue, black, red, green, and/or other colors. A facet generally include a type and one or more values associated with the type. For example, a facet type can be "color" and an associated facet value can be "blue." Sometimes, the facet is represented as type: value, such as color: Blue. The user can select one or more of these colors to filter the items in item listing 414 by those one or more colors. A number of items that satisfy each of the color values can be displayed along with each of the colors in filtering menu 421, as shown in FIG. 4. Other browse shelves might include the "color" facet, but the facet values (e.g., specific colors) for such other browse shelves may be different than the colors in the Kids' BMX Bikes browse shelf.

When a user enters a query in a search engine, they query may include information that can be extracted and associated as related to facets of browse shelves. For example, for a query of "blue mogoose Bike," extracted facets can include color: Blue and brand: Mongoose. As another example, for a query of "sony 65 tv," extracted facets can include tv_screen_size_range: 60"-69" and brand: Sony. As another example, for a query of "adidas shoe for girl," extracted facets can include gender: Girls and brand: Adidas. As another example, for a query of "Linenspa Explorer 6 Innerspring Mattress, Twin size," extracted facets can include material: Innerspring, brand: Linenspace, and bed_size: Twin. As another example, for a query of "nike red basketball shoe," extracted facets can include color: Red and brand: Nike. As another example, for a query of "The Danish girl," extracted facets in a naïve approach might include gender: Girls. However, "girl" should not be a valid shelf-specific facet value for the query "The Danish girl," because "The Danish Girl" is a novel and film, and gender is not a shelf-specific facet for filtering items in the browse shelves related to novels and films (movies). This example, demonstrates that shelf-specific facet extraction can be advantageous over generalized (non-shelf-specific) facet extraction.

The facet universe can include all of the facet types used in any of the browse shelves. For example, the bed type facet type can be a shelf-specific facet type for only one browse shelf and have 18 different facet values, while the operating_system facet type can be a shelf-specific facet type for 52 browse shelves and have 15 different values, the gender facet type can be a shelf-specific facet type for 14,000 browse shelves and have 8 different facet values, and the brand facet type can be a shelf-specific facet type for 39,000 browse shelves and have 101,697 different facet values.

Figure 7:
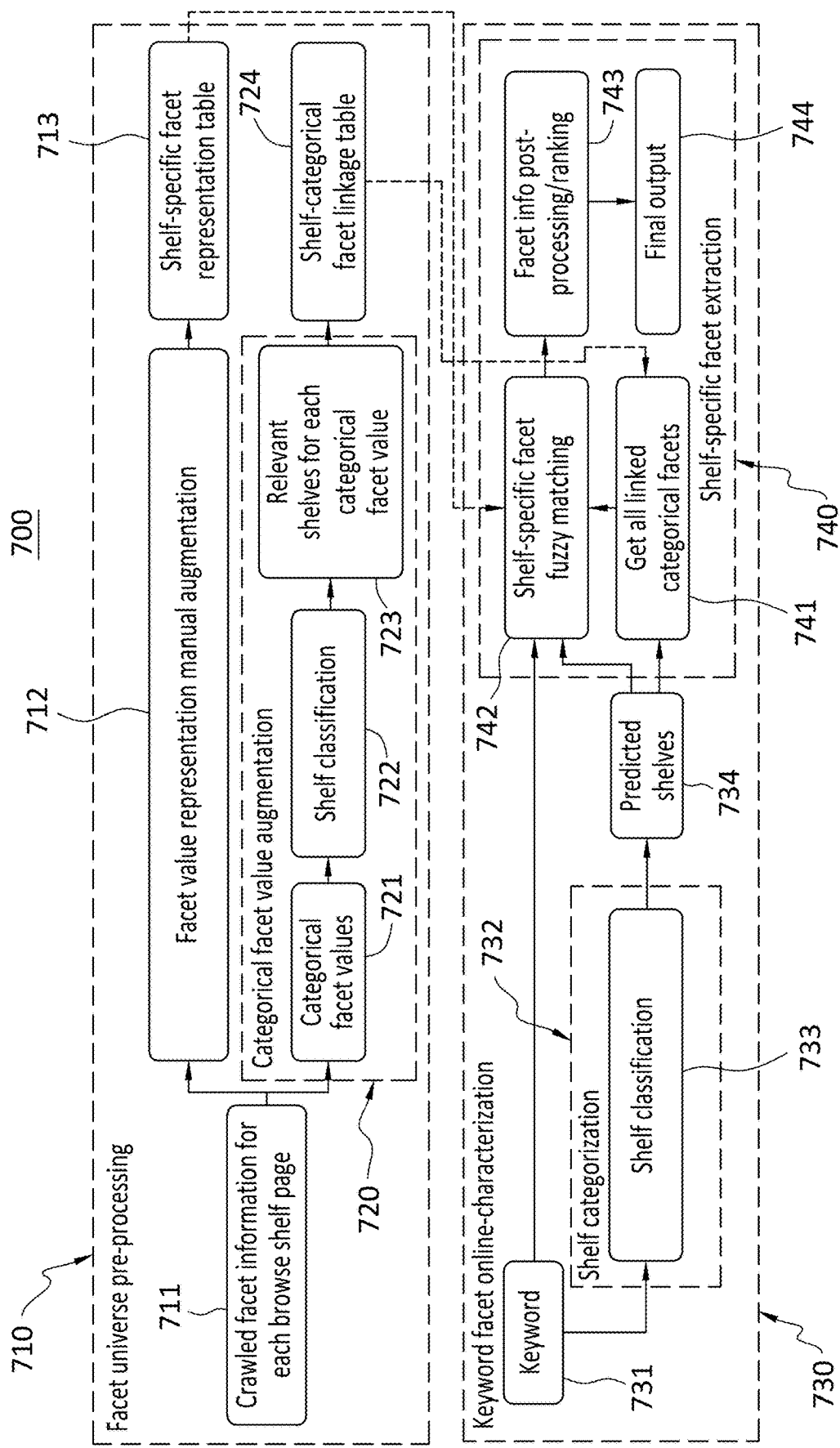
FIG. 7 illustrates a method of providing shelf-specific facet extraction, according to any embodiment.

Jumping ahead in the drawings, FIG. 7 illustrates a method 700 of providing shelf-specific facet extraction, according to any embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped.

Referring to FIG. 7, method 700 can include an activity 710 of performing facet universe pre-processing, which can include activities 711-713 and 720-724 described below. Method 700 also can include an activity 730 of performing keyword facet online-characterization, which can include activities 731-734 and 740-744, described below. In many embodiments, activity 710 can be performed once (e.g., pre-computed) before performing activity 730, and activity 730 can be performed many times for many different keyword queries without performing activity 710 again until there is a change in the facet universe. In many embodiments, activity 730 can be performed in real-time, such that a keyword query can be input and shelf-specific facet extraction can be performed and output in real-time.

In a number of embodiments, activity 710 can include activity 711 of obtaining or generating a facet universe. The facet universe can be the facet information collected from the browse pages. In some embodiments, the facet universe can be generated by crawling the browse pages to determine the facets that are used on the browse pages. For example, the facet universe can include {gender: [male, female, girl, boy, unisex], color: [black, red, white], category: [sofa, patio furniture], . . . }. In this list, gender, color, and category are facet types, and the values in the brackets following the facet type are the facet values associated with the facet type.

In several embodiments, activity 710 also can include activity 712 of performing a facet value representation manual augmentation. In many embodiments, the facet values in the facet universe can be augmented to include alternative values. For example, in the facet type of gender, the facet value of "boy" can be augmented to include "boys", "boy's", and "boys'".

In a number of embodiments, activity 710 additionally can include activity 713 of storing a shelf-specific facet representation table. For example, the facets, including the facet types, the facet values, and the facet augmentations can be stored in a table as follows:

"gender":

```
{'boy':["boys", "boy's", "boys'"],
'female':["woman", "women", "womens", "women's", "girl", "girls",
    "lady", "ladies"],
'girls':["girl", "girl's", "girls'"],
'male':['man', 'men', 'mens', "men's", "boy's", 'boy', "boys", "gentlemen"],
...
```

"headphone type":

```
{'Wireless Headphones':["wireless"],
'In-Ear Headphones':["in-ear", "in ear"],
'On-Ear & Over-Ear Headphones':["on-ear", "over-ear", "on ear", "over
    ear"],
'Pro & DJ':["pro", "dj"]},
```

In several embodiments, activity 710 further can include activity 720 of performing categorical facet value augmentation. Activity 720 can include activities 721-723, described below.

In some embodiments, activity 720 can include activity 721 of determining the categorical facet values from the facet universe. There can be different type of facet types, such as ordinary facet types and categorical facet types. Ordinary facet types can shelf-specific, such as gender, color, material, size, etc. By contrast, categorical facet types can contain categorical information that applies across multiple browse shelves, such as category, global product type, etc.

In a number of embodiments, activity 720 also can include activity 722 of performing shelf classification. In many embodiments, shelf classification can be performed as described in U.S. patent application Ser. No. 16/777,085, filed Jan. 30, 2020, which was published as U.S. Patent Application Publication No. 2021/0240742, and which is incorporated herein by reference in its entirety.

In some embodiments, activity 720 additionally can include activity 723 of outputting relevant shelves from each categorical facet value. This output can be the output of the shelf classification of activity 722, described above.

In a number of embodiments, activity 710 also can include activity 724 of storing a shelf-categorical facet linkage table. The shelf-categorical facet linkage table can be a linkage table that links each of the categorical facet values to various respective browse shelves, based on the relationships determined in activity 722 and output in activity 723.

In many embodiments, activities 712-713 can be performed in parallel with activities 720-724, such as on separate processes or separate threads.

In several embodiments, activity 730 can include activity 731 of obtaining a keyword. The keyword can be a single word, a set of words, or a keyword query.

In some embodiments, activity 730 also can include activity 732 of performing shelf categorization, which can involve categorizing the keyword into one or more shelves. In a number of embodiments, activity 732 can include activity 733 of performing shelf classification, which can be implemented similar as described above in connection with activity 722 of performing shelf classification, and as described in U.S. patent application Ser. No. 16/777,085.

In many embodiments, activity 730 additionally can include activity 734 of outputting prediction shelves. The prediction shelves can be those browse shelves that are related to the keyword, as determined in activity 732-733.

In a number of embodiments, activity 730 can include an activity 740 of performing shelf-specific facet extraction. In some embodiments, activity 740 can include activities 741-744, as described below.

In many embodiments, activity 740 can include activity 741 of determining all linked categorical facets. In some embodiments, activity 741 can involve using the predicted shelves output in activity 734 and mapping those predicted shelves in the shelf-categorical linkage table stored in activity 724 to determine relevant potential categorical facets.

In several embodiments, activity 740 also can include activity 742 of performing shelf-specific facet fuzzy matching. In some embodiments, activity 742 can involve checking for the existence of shelf-specific augmented facet value representations in the keyword using the shelf-specific facet representation table stored in activity 713 for the predicted shelves. In many embodiments, activity 742 can proceed one facet after another using fuzzy text matching. In a number of embodiments, the linked relevant categorical facets determined in activity 741 also can be checked for each predicted shelf one by one. The facet can be added in the output if that facet exists in the browse shelf.

In a number of embodiments, fuzzy matching can include character-level mismatch tolerance, which can be based on text length of the keyword. For example, the misspelling "mogoose" can be matched to "mongoose". However, for a shorter word, such as "red," misspellings are less likely, as spelling differences are more likely to intend a different word. However, for longer keyword terms, such as "Louis Vuitton," two typographical errors in the term can be corrected.

In many embodiments, activity 740 can include activity 743 of performing facet information post-processing. In a browse shelf, there can be more than one facet value discovered in the keyword. And, for brand facet type, there can be overlapped brands being discovered. For example, in the keyword query "Philips hue light strip", "Philips hue" is a sub-brand of "Philips" and both "Philips hue" and "Philips" can be found in the fuzzy matching phase in activity 742. In order to provide concise and specific extracted facets, post-processing on the candidate facets determined in activity 742 to keep only the mutually distinct facets. Because "Philips" is a sub-word in "Philips hue," "Philips hue" can have a higher rank and "Philips" can be deduped (i.e., filtered out). The duplicated (or overlapping) facet values can be determined by computing text overlapping percentage for arbitrary pairs of facet value candidates.

In several embodiments, activity 740 also can include activity 744 of outputting the final output, which can be the output generated in activity 743. In some embodiments, the output can map the keyword to one or more shelves and one or more respective shelf-specific facets for each of the one or more shelves. The keyword/query can be categorized to one or more than one shelves, and shelf-specific facet extraction can be accordingly applied to the categorized shelves for that keyword/query.

For example, the keyword query "blue mogoose Bike" can be mapped to the browse shelf named "Kids' BMX Bikes", and the follow shelf-specific facets can be extracted in that browse shelf: color: Blue and brand: Mongoose. In some embodiments, the output can be provided as follows:

Input: 'blue mogoose Bike',
Output:

[{'shelf_id': 7577999,
'shelf_name': "Kids' BMX Bikes",

-continued

```
'shelf_pcp_id': '0/4125/1081404/9240575/7577999', 'shelf_pcp': "Home
    Page/Sports & Outdoors/Bikes/Kids Bikes/Kids' BMX Bikes",
'facet': {'value': ['color:Blue', 'brand:Mongoose']}}...]
```

As another example, the keyword query "Linenspa Explorer 6 Innerspring Mattress, Twin size" can be mapped to the browse shelf named "Mattresses", and the follow shelf-specific facets can be extracted in that browse shelf: material: Innerspring, brand: Linenspa, bed_size: Twin, category: Mattresses. In some embodiments, the output can be provided as follows:

Input: 'Linenspa Explorer 6 Innerspring Mattress, Twin size',
Output:

```
[{'shelf_id': 927959,
'shelf_name': 'Mattresses',
'shelf_pcp_id': '0/4044/103150/539386/927959',
'shelf_pcp': 'Home Page/Home/Furniture/Mattresses & Accessories/Mattresses',
'facet': {'value': ['material:Innerspring', 'brand:Linenspa', 'bed_size:Twin',
    'category:Mattresses'],}}...]
```

As a further example, the keyword query "'pure air wick" can be mapped to a first browse shelf named "Air Wick Air Fresheners" and a second browse shelf named "Air Wick Automatic Sprayers". Within the Air Wick Air Fresheners browse shelf, the follow shelf-specific facets can be extracted in that browse shelf: brand: AIR WICK. Within the Air Wick Automatic Sprayers browse shelf, the follow shelf-specific facets can be extracted in that browse shelf: brand: AIR WICK. In some embodiments, the output can be provided as follows:

Input: 'pure air wick',
Output:

```
[{'shelf_id': 4932078,
'shelf_name': 'Air Wick Air Fresheners',
'shelf_pcp_id': '0/1115193/8250903/8458761/4932078', 'shelf_pcp': 'Home
    Page/Household Essentials/Household Essentials by Brand/Air Wick/Air Wick
    Air Fresheners',
'facet': {'value': ['brand:AIR WICK',]}},
{'shelf_id': 8055160,
'shelf_name': 'Air Wick Automatic Sprayers',
'shelf_pcp_id': '0/1115193/1025739/7085880/8055160',
'shelf_pcp': 'Home Page/Household Essentials/Air Fresheners/Automatic Air
    Fresheners/Air Wick Automatic Sprayers',
'facet': {'value': ['brand:AIR WICK',]}}
...]
```

Figure 8:
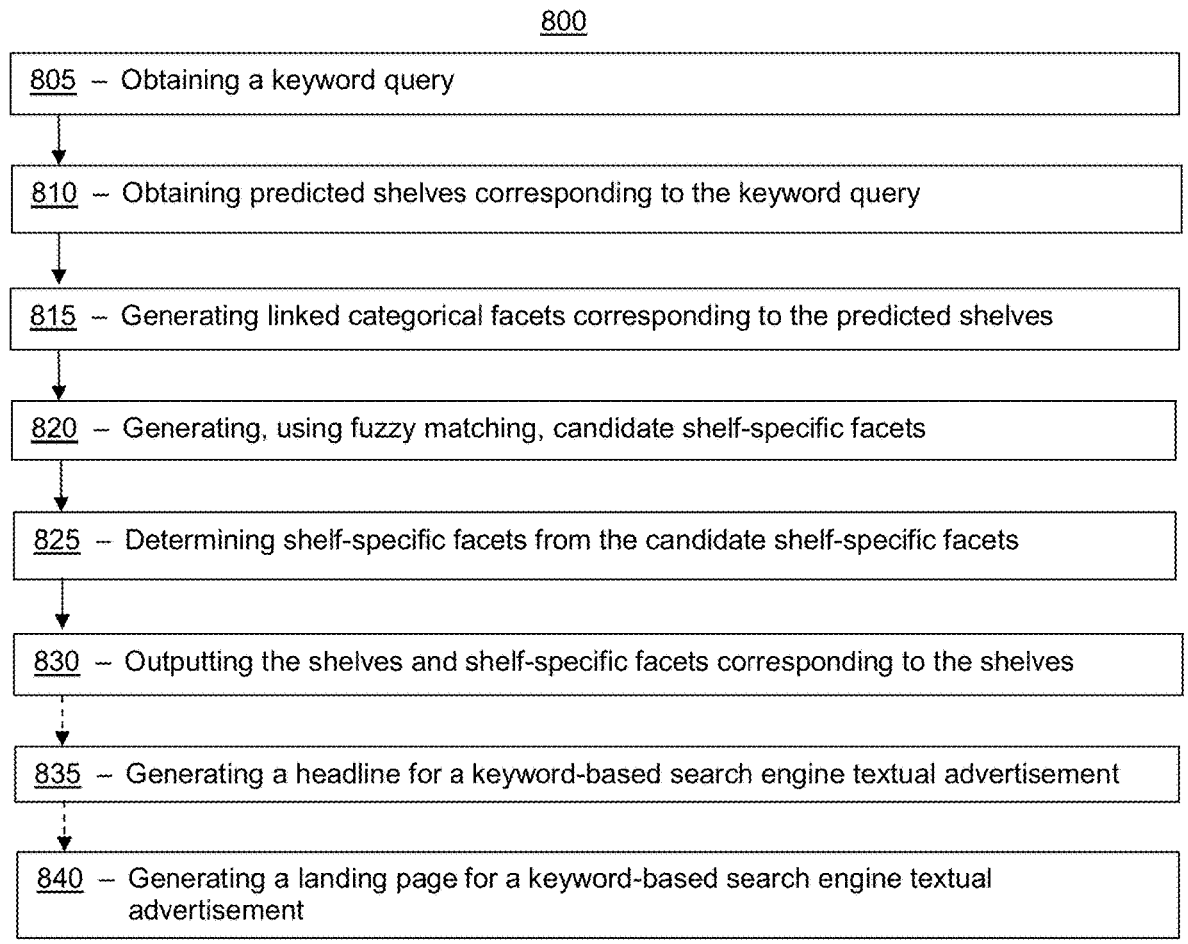
FIG. 8 illustrates a flow chart for a method of providing shelf-specific facet extraction, according to another embodiment.

Turning back in the drawings, FIG. 8 illustrates a flow chart for a method 800 of providing shelf-specific facet extraction, according to another embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

In many embodiments, system 300 (FIG. 3), facet extraction system 310 (FIG. 3), and/or web server 320 (FIG. 3) can be suitable to perform method 800 and/or one or more of the activities of method 800. In these or other embodiments, one or more of the activities of method 800 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 800 and other activities in method 800 can include using a distributed network including distributed memory architecture to perform the associated activity. This distributed architecture can reduce the impact on the network and system resources to reduce congestion in bottlenecks while still allowing data to be accessible from a central location.

Referring to FIG. 8, method 800 can include an activity 805 of obtaining a keyword query. Activity 805 can be similar or identical to activity 731 (FIG. 7).

In a number of embodiments, method 800 also can include an activity 810 of obtaining one or more predicted shelves corresponding to the keyword query. Activity 810 can be similar or identical to activity 733 and/or 734 (FIG. 7).

In several embodiments, method 800 additionally can include an activity 815 of generating linked categorical facets corresponding to the one or more predicted shelves based on shelf-categorical facet linkages. Activity 815 can be similar or identical to activity 741 (FIG. 7). In some embodiments, activity 815 of generating the linked categorical facets further can include generating the linked categorical facets corresponding to the one or more predicted shelves based on linkages between browse shelves and categorical facet values. In many embodiments, the linkages between the browse shelves and the categorical facet values can be generated before obtaining the keyword query. For example, the linkages can be similar or identical to the information stored in shelf-categorical facet linkage table in activity 724 (FIG. 7).

In a number of embodiments, method 800 further can include an activity 820 of generating, using fuzzy matching, candidate shelf-specific facets based on shelf-specific facet representation mappings and the linked categorical facets. Activity 820 can be similar or identical to activity 742 (FIG. 7). The shelf-specific facet representations mappings can be similar or identical to the shelf-specific facet representation table stored in activity 713 (FIG. 7). In some embodiments, the shelf-specific facet representation mappings can be generated before obtaining the keyword query by augmenting facet values to include alternate values. In a number of embodiments, activity 820 of generating, using fuzzy matching, the candidate shelf-specific facets further can include performing fuzzy matching based on a tolerance threshold for character-level mismatches. In several embodiments, the tolerance threshold can vary based on a text length of the keyword query, as explained above in connection with activity 742 (FIG. 7).

In several embodiments, method 800 additionally can include an activity 825 of determining one or more shelf-specific facets from the candidate shelf-specific facets based on facet information in the candidate shelf-specific facets. The one or more shelf-specific facets can correspond to one or more shelves of the one or more predicted shelves. Activity 825 can be similar or identical to activity 743 (FIG. 7). In some embodiments, activity 825 of determining the one or more shelf-specific facets from the candidate shelf-specific facets further can include determining mutually distinct facets from the candidate shelf-specific facets, which can include determining an overlap percentage between a pair of the candidate shelf-specific facets. When the overlap percentage exceeds a predetermined threshold, selecting a more-specific facet value from the pair of the candidate shelf-specific facets.

In a number of embodiments, method 800 further can include an activity 830 of outputting the one or more shelves and one or more respective shelf-specific facets of the one or more shelf-specific facets that correspond to each of the one or more shelves. Activity 830 can be similar or identical to activity 734 (FIG. 7).

In several embodiments, method 800 optionally can include an activity 835 of generating a headline for a keyword-based search engine textual advertisement to include at least one of the one or more respective shelf-specific facets that correspond to at least one of the one or more shelves. In some embodiments, the textual advertisement can be similar or identical to textual advertisement 500 shown in FIG. 5.

Figures 5, 6:
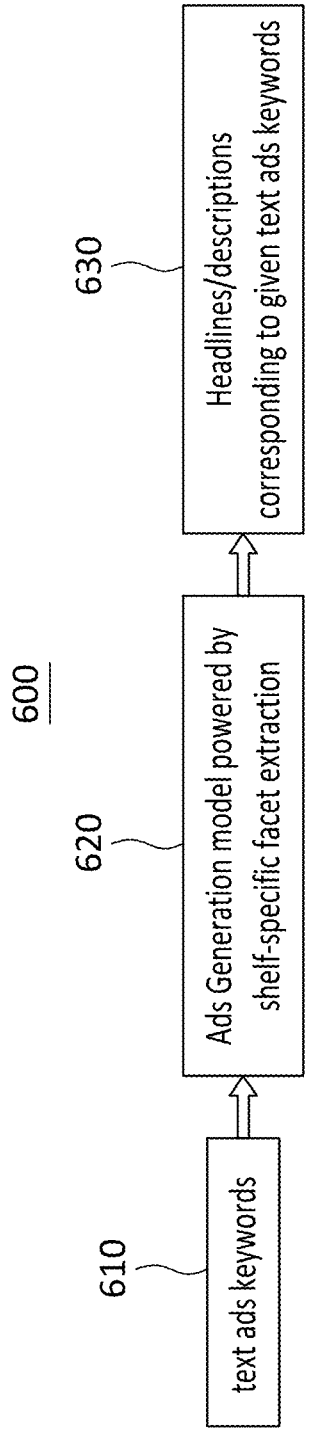
FIG. 5 illustrates an exemplary textual advertisement.
FIG. 6 illustrates a method of generating text ads based on shelf-specific facets.

Turning backward in the drawings, FIG. 5 illustrates an exemplary textual advertisement 500. Textual advertisement 500 is merely exemplary and is not limited to the example shown. The textual advertisement can be employed in many different examples not specifically depicted or described herein. Textual advertisement 500 (also referred to as text ad 500) can be displayed on a search engine result page in response to a user entering a query. Text ad 500 can include a landing page link 510 and/or a headline 520 (also referred to as a description). Headline 520 includes text that advertises landing page link 510, to entice a user (e.g., 350 (FIG. 3)) to click on landing page link 510. By clicking on landing page link 510, the user will go to the associated landing page (e.g., Walmart.com). The SEM bidding for text ad 500 can be based on keywords/queries input by the user in the search engine.

Proceeding to the next drawing, FIG. 6 illustrates a method 600 of generating text ads based on shelf-specific facets. Method 600 of generating text ads can use the shelf-specific facet extraction techniques described here. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

Referring to FIG. 6, method 600 can include an activity 610 of obtaining text ad keywords. For example, the keywords can be keywords that would be bid on for a text ad (e.g., 500 (FIG. 5)).

In several embodiments, method 600 also can include an activity 620 of performing an ad generation model powered by the shelf-specific facet extraction. For examples, the shelf-specific facet extract can be performed as described in method 700 (FIG. 7) and/or activities 805-830 (FIG. 8).

In a number of embodiments, method 600 additionally can include an activity 630 of generating headline/descriptions corresponding to given text ad keywords. In some embodiments, template can be used that incorporates the shelf-specific facets that are extracted from the keyword/query. For example, a template can be as follows, in which the braces indicate the shelf-specific facets to use.

{category} at Walmart; Save On Quality {brand} {color} . . . {category} etc.

Returning to FIG. 8, in a number of embodiments, method 800 further optionally can include an activity 840 of generating a landing page for a keyword-based search engine textual advertisement to filter based on at least one of the one or more respective shelf-specific facets that correspond to at least one of the one or more shelves. For example, for a keyword query that is associated to a text ad, the landing page (e.g., 510 (FIG. 5)) for the can be set to proceed to the browse page in which the shelf-specific facets (as extracted for that keyword query) are set to be filtered on the browse page. For example, as shown in FIG. 4, the facets in filtering menu 421 can be pre-set for the landing page, so that the user (e.g., 350 (FIG. 3)) can see the filtered page upon arriving at the landing page from the third-party search engine without having to select filter menu button 413. Alternatively, or in addition, an internal search query on the e-commerce website through web server 320 (FIG. 3) can include sponsored ads that can automatically filter items based on extracted facets from the queries.

Returning to FIG. 3, in several embodiments, communication system 311 can at least partially perform activity 731 (FIG. 7) of obtaining a keyword, activity 744 (FIG. 7) of outputting the final output, activity 805 (FIG. 8) of obtaining a keyword query, activity 830 (FIG. 8) of outputting the one or more shelves and one or more respective shelf-specific facets of the one or more shelf-specific facets that correspond to each of the one or more shelves, activity 835 (FIG. 8) of generating a headline for a keyword-based search engine textual advertisement to include at least one of the one or more respective shelf-specific facets that correspond to at least one of the one or more shelves, and/or activity 840 (FIG. 8) of generating a landing page for a keyword-based search engine textual advertisement to filter based on at least one of the one or more respective shelf-specific facets that correspond to at least one of the one or more shelves.

In several embodiments, facet pre-processing system 312 can at least partially perform activity 710 (FIG. 7) of performing facet universe pre-processing, activity 711 (FIG. 7) of obtaining or generating a facet universe, activity 712 (FIG. 7) of performing a facet value representation manual augmentation, activity 713 (FIG. 7) of storing a shelf-specific facet representation table, activity 720 (FIG. 7) of performing categorical facet value augmentation, activity 721 (FIG. 7) of determining the categorical facet values from the facet universe, activity 722 (FIG. 7) of performing shelf classification, activity 723 (FIG. 7) of outputting relevant shelves from each categorical facet value, and/or activity 724 (FIG. 7) of storing a shelf-categorical facet linkage table.

In a number of embodiments, facet characterization system 313 can at least partially perform activity 730 (FIG. 7) of performing keyword facet online-characterization, activity 731 (FIG. 7) of obtaining a keyword, activity 732 (FIG. 7) of performing shelf categorization, which can involve categorizing the keyword into one or more shelves, activity 733 (FIG. 7) of performing shelf classification, activity 734 (FIG. 7) of outputting prediction shelves, activity 740 (FIG. 7) of performing shelf-specific facet extraction, activity 741 (FIG. 7) of determining all linked categorical facets, activity 742 (FIG. 7) of performing shelf-specific facet fuzzy matching, activity 743 (FIG. 7) of performing facet information post-processing, activity 744 (FIG. 7) of outputting the final output, activity 805 (FIG. 8) of obtaining a keyword query, activity 810 (FIG. 8) of obtaining one or more predicted shelves corresponding to the keyword query, activity 815 (FIG. 8) of generating linked categorical facets corresponding to the one or more predicted shelves based on shelf-categorical facet linkages, activity 820 (FIG. 8) of generating, using fuzzy matching, candidate shelf-specific facets based on shelf-specific facet representation mappings and the linked categorical facets, activity 825 (FIG. 8) of determining one or more shelf-specific facets from the candidate shelf-specific facets based on facet information in the candidate shelf-specific facets, and/or activity 830 (FIG. 8) of outputting the one or more shelves and one or more respective shelf-specific facets of the one or more shelf-specific facets that correspond to each of the one or more shelves.

In several embodiments, ad generation system 314 can at least partially perform activity 610 (FIG. 6) of obtaining text ad keywords, activity 620 (FIG. 6) of performing an ad generation model powered by the shelf-specific facet extraction, activity 630 (FIG. 6) of generating headline/descriptions corresponding to given text ad keywords, activity 835 (FIG. 8) of generating a headline for a keyword-based search engine textual advertisement to include at least one of the one or more respective shelf-specific facets that correspond to at least one of the one or more shelves, and/or activity 840 (FIG. 8) of generating a landing page for a keyword-based search engine textual advertisement to filter based on at least one of the one or more respective shelf-specific facets that correspond to at least one of the one or more shelves.

In many embodiments, the techniques described herein can provide a practical application and several technological improvements. In some embodiments, the techniques described herein can provide for shelf-specific facet extraction. The techniques described herein can provide a significant improvement over conventional approaches that fail to take into account the relevant browse shelves when extracting facets. In many embodiments, the techniques described herein can support shelf-specific query entity extraction. In several embodiments, the techniques described herein can support entity extraction of more than 450 facet types and more than one million facet values, which can be at a scale that humans could not perform. In some embodiments, the techniques described herein can support fuzzy entity extraction, which can greatly reduce the under-extraction caused by entity variation and misspelling. In several embodiments, the techniques described herein can support single or multi shelf-specific facet characterization. In a number of embodiments, the techniques described herein can perform facet characterization with customized facet types.

Conventional approaches use ordinary facet extraction, such as name entity recognition (NER), which is not shelf-specific. The shelf-specific facet extraction described herein can provide better insight in understanding search queries and purchasing intents of users (e.g., 350 (FIG. 3)). Conventional NER approaches involve large numbers of labelled/tagged entity training data. By contrast, the shelf-specific facet extraction described herein is training-free, which can quickly adapt to facet changes/updates. Conventional NER approaches are generally limited recognizing a very small number of facet types. By contrast, the shelf-specific facet extraction described herein can support more 450 facet types or more, and 1 million different facet values or more.

In a number of embodiments, the techniques described herein can solve a technical problem that arises only within the realm of computer networks, as online ordering is a concept that do not exist outside the realm of computer networks. Moreover, the techniques described herein can solve a technical problem that cannot be solved outside the context of computer networks. Specifically, the techniques described herein cannot be used outside the context of computer networks, in view of a lack of data, the lack of browse shelf pages and search engine result pages outside computer networks, and the inability to perform the extractions in real-time without a computer.

Various embodiments can include a system including one or more processors and one or more non-transitory computer-readable media storing computing instructions that, when executed on the one or more processors, cause the one or more processor to perform certain acts. The acts can include obtaining a keyword query. The acts also can include obtaining one or more predicted shelves corresponding to the keyword query. The acts additionally can include generating linked categorical facets corresponding to the one or more predicted shelves based on shelf-categorical facet linkages. The acts further can include generating, using fuzzy matching, candidate shelf-specific facets based on shelf-specific facet representation mappings and the linked categorical facets. The acts additionally can include determining one or more shelf-specific facets from the candidate shelf-specific facets based on facet information in the candidate shelf-specific facets. The one or more shelf-specific facets can correspond to one or more shelves of the one or more predicted shelves. The acts further can include outputting the one or more shelves and one or more respective shelf-specific facets of the one or more shelf-specific facets that correspond to each of the one or more shelves.

A number of embodiments can include a method being implemented via execution of computing instructions configured to run at one or more processors. The method can include obtaining a keyword query. The method also can include obtaining one or more predicted shelves corresponding to the keyword query. The method additionally can include generating linked categorical facets corresponding to the one or more predicted shelves based on shelf-categorical facet linkages. The method further can include generating, using fuzzy matching, candidate shelf-specific facets based on shelf-specific facet representation mappings and the linked categorical facets. The method additionally can include determining one or more shelf-specific facets from the candidate shelf-specific facets based on facet information in the candidate shelf-specific facets. The one or more shelf-specific facets can correspond to one or more shelves of the one or more predicted shelves. The method further can include outputting the one or more shelves and one or more respective shelf-specific facets of the one or more shelf-specific facets that correspond to each of the one or more shelves.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although shelf-specific facet extraction has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 6 and 7-8 may include different procedures, processes, and/or activities and be performed by many different modules, in many different orders, and/or one or more of the procedures, processes, or activities of FIGS. 6 and 7-8 may include one or more of the procedures, processes, or activities of another different one of FIGS. 6 and 7-8. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

a processor; and a non-transitory computer-readable medium storing computing instructions that, when executed on the processor, cause the processor to perform operations comprising:

obtaining a keyword query through a graphical user interface;

obtaining search results corresponding to the keyword query;

obtaining one or more predicted shelves corresponding to the keyword query;

determining linked categorical facets corresponding to the one or more predicted shelves based on shelf-categorical facet linkages in a shelf-categorical facet linkage table, wherein the shelf-categorical facet linkages in the shelf-categorical facet linkage table comprise linkages between browse shelves and categorical facet values, wherein the browse shelves in the shelf-categorical facet linkages in the shelf-categorical facet linkage table each comprise a respective shelf name within a product taxonomy of an electronic item catalog, wherein the linked categorical facets comprise the categorical facet values linked to the one or more predicted shelves in the shelf-categorical facet linkages in the shelf-categorical facet linkage table, wherein the categorical facet values contain categorical information that applies across multiple browse shelves, and wherein the one or more predicted shelves are one or more of the browse shelves;

performing fuzzy matching of keywords of the keyword query with (i) shelf-specific facet representation mappings that are generated and stored before the keyword query is obtained and (ii) the linked categorical facets, based on a tolerance threshold for character-level mismatches, to determine candidate shelf-specific facets, wherein the tolerance threshold for the character-level mismatches increases dynamically according to a text length of the keyword query, wherein the shelf-specific facet representation mappings comprise shelf-specific facet types and shelf-specific augmented facet values, and wherein the shelf-specific augmented facet values are generated based on inflected forms, derived forms, and synonyms of facet values;

determining one or more shelf-specific facets from the candidate shelf-specific facets based on facet information in the candidate shelf-specific facets, wherein the one or more shelf-specific facets correspond to one or more shelves of the one or more predicted shelves; and outputting, on the graphical user interface in real-time after receiving the keyword query, adjacent to the search results displayed responsive to the keyword query, (i) the one or more shelves of the one or more predicted shelves that correspond to the one or more shelf-specific facets from the candidate shelf-specific facets and (ii) one or more respective shelf-specific facets of the one or more shelf-specific facets that correspond to each of the one or more shelves, wherein the graphical user interface comprises selectable options for the one or more shelf-specific facets that correspond to the one or more shelves to enable filtering the search results on the graphical user interface based on the one or more shelf-specific facets that correspond to the one or more shelves.

2. The system of claim 1, wherein outputting the one or more shelves and the one or more respective shelf-specific facets further comprises:

outputting a facet type and a facet value for each of the one or more respective shelf-specific facets.

3. The system of claim 1, wherein the linkages between the browse shelves and the categorical facet values exist before obtaining the keyword query.

4. The system of claim 1, wherein the operations further comprise:

generating the shelf-specific facet representation mappings before obtaining the keyword query by augmenting facet values to include alternate values.

5. The system of claim 1, wherein the derived forms comprise suffixes and prefixes, and wherein the inflected forms comprise plurals.

6. The system of claim 1, wherein determining the one or more shelf-specific facets from the candidate shelf-specific facets further comprises:

determining mutually distinct facets from the candidate shelf-specific facets.

7. The system of claim 1, wherein determining the one or more shelf-specific facets from the candidate shelf-specific facets further comprises:

determining an overlap percentage between a first facet value and a second facet value of a pair of the candidate shelf-specific facets having a common facet type; and when the overlap percentage exceeds a predetermined threshold, selecting a more-specific facet value from the first facet value or the second facet value of the pair of the candidate shelf-specific facets.

8. The system of claim 1, wherein the operations further comprise:

generating a headline for a keyword-based search engine textual advertisement to include at least one of the one or more respective shelf-specific facets that correspond to at least one of the one or more shelves.

9. The system of claim 1, wherein the operations further comprise:

generating a landing page for a keyword-based search engine textual advertisement to filter based on at least one of the one or more respective shelf-specific facets that correspond to at least one of the one or more shelves.

10. A method implemented via execution of computing instructions configured to run at a processor, the method comprising:

obtaining a keyword query through a graphical user interface;

obtaining search results corresponding to the keyword query;

obtaining, by the processor, one or more predicted shelves corresponding to the keyword query;

determining linked categorical facets corresponding to the one or more predicted shelves based on shelf-categorical facet linkages in a shelf-categorical facet linkage table, wherein the shelf-categorical facet linkages in the shelf-categorical facet linkage table comprise linkages between browse shelves and categorical facet values, wherein the browse shelves in the shelf-categorical facet linkages in the shelf-categorical facet linkage table each comprise a respective shelf name within a product taxonomy of an electronic item catalog, wherein the linked categorical facets comprise the categorical facet values linked to the one or more predicted shelves in the shelf-categorical facet linkages in the shelf-categorical facet linkage table, wherein the categorical facet values contain categorical information that applies across multiple browse shelves, and wherein the one or more predicted shelves are one or more of the browse shelves;

performing fuzzy matching of keywords of the keyword query with (i) shelf-specific facet representation mappings that are generated and stored before the keyword query is obtained and (ii) the linked categorical facets, based on a tolerance threshold for character-level mismatches, to determine candidate shelf-specific facets, wherein the tolerance threshold for the character-level mismatches increases dynamically according to a text length of the keyword query, wherein the shelf-specific facet representation mappings comprise shelf-specific facet types and shelf-specific augmented facet values, and wherein the shelf-specific augmented facet values are generated based on inflected forms, derived forms, and synonyms of facet values;

determining, by the processor, one or more shelf-specific facets from the candidate shelf-specific facets based on facet information in the candidate shelf-specific facets, wherein the one or more shelf-specific facets correspond to one or more shelves of the one or more predicted shelves; and outputting, on the graphical user interface in real-time after receiving the keyword query, adjacent to the search results displayed responsive to the keyword query, (i) the one or more shelves of the one or more predicted shelves that correspond to the one or more shelf-specific facets from the candidate shelf-specific facets and (ii) one or more respective shelf-specific facets of the one or more shelf-specific facets that correspond to each of the one or more shelves, wherein the graphical user interface comprises selectable options for the one or more shelf-specific facets that correspond to the one or more shelves to enable filtering the search results on the graphical user interface based on the one or more shelf-specific facets that correspond to the one or more shelves.

11. The method of claim 10, wherein outputting the one or more shelves and the one or more respective shelf-specific facets further comprises:

outputting a facet type and a facet value for each of the one or more respective shelf-specific facets.

12. The method of claim 10, wherein the linkages between the browse shelves and the categorical facet values exist before obtaining the keyword query.

13. The method of claim 10, further comprising:
generating, by the processor, the shelf-specific facet representation mappings before obtaining the keyword query by augmenting facet values to include alternate values.

14. The method of claim 10, wherein the derived forms comprise suffixes and prefixes, and wherein the inflected forms comprise plurals.

15. The method of claim 10, wherein determining the one or more shelf-specific facets from the candidate shelf-specific facets further comprises:
determining mutually distinct facets from the candidate shelf-specific facets.

16. The method of claim 10, wherein determining the one or more shelf-specific facets from the candidate shelf-specific facets further comprises:
determining an overlap percentage between a first facet value and a second facet value of a pair of the candidate shelf-specific facets having a common facet type; and
when the overlap percentage exceeds a predetermined threshold, selecting a more-specific facet value from the first facet value or the second facet value of the pair of the candidate shelf-specific facets.

17. The method of claim 10, further comprising:
generating a headline for a keyword-based search engine textual advertisement to include at least one of the one or more respective shelf-specific facets that correspond to at least one of the one or more shelves.

18. The method of claim 10, further comprising:
generating a landing page for a keyword-based search engine textual advertisement to filter based on at least one of the one or more respective shelf-specific facets that correspond to at least one of the one or more shelves.

19. A non-transitory computer-readable medium storing computing instructions that, when executed on a processor, cause the processor to perform operations comprising:
obtaining a keyword query through a graphical user interface;
obtaining search results corresponding to the keyword query;
obtaining one or more predicted shelves corresponding to the keyword query;
determining linked categorical facets corresponding to the one or more predicted shelves based on shelf-categorical facet linkages in a shelf-categorical facet linkage table, wherein the shelf-categorical facet linkages in the shelf-categorical facet linkage table comprise linkages between browse shelves and categorical facet values, wherein the browse shelves in the shelf-categorical facet linkages in the shelf-categorical facet linkage table each comprise a respective shelf name within a product taxonomy of an electronic item catalog, wherein the linked categorical facets comprise the categorical facet values linked to the one or more predicted shelves in the shelf-categorical facet linkages in the shelf-categorical facet linkage table, wherein the categorical facet values contain categorical information that applies across multiple browse shelves, and wherein the one or more predicted shelves are one or more of the browse shelves;
performing fuzzy matching of keywords of the keyword query with (i) shelf-specific facet representation mappings that are generated and stored before the keyword query is obtained and (ii) the linked categorical facets, based on a tolerance threshold for character-level mismatches, to determine candidate shelf-specific facets, wherein the tolerance threshold for the character-level mismatches increases dynamically according to a text length of the keyword query, wherein the shelf-specific facet representation mappings comprise shelf-specific facet types and shelf-specific augmented facet values, and wherein the shelf-specific augmented facet values are generated based on inflected forms, derived forms, and synonyms of facet values;
determining one or more shelf-specific facets from the candidate shelf-specific facets based on facet information in the candidate shelf-specific facets, wherein the one or more shelf-specific facets correspond to one or more shelves of the one or more predicted shelves; and
outputting, on the graphical user interface in real-time after receiving the keyword query, adjacent to the search results displayed responsive to the keyword query, (i) the one or more shelves of the one or more predicted shelves that correspond to the one or more shelf-specific facets from the candidate shelf-specific facets and (ii) one or more respective shelf-specific facets of the one or more shelf-specific facets that correspond to each of the one or more shelves, wherein the graphical user interface comprises selectable options for the one or more shelf-specific facets that correspond to the one or more shelves to enable filtering the search results on the graphical user interface based on the one or more shelf-specific facets that correspond to the one or more shelves.

20. The non-transitory computer-readable medium of claim 19 wherein the operations further comprise:
generating the shelf-specific facet representation mappings before obtaining the keyword query by augmenting facet values to include alternate values.

* * * * *